United States Patent [19]
Palmer

[11] Patent Number: 6,078,403
[45] Date of Patent: Jun. 20, 2000

[54] METHOD AND SYSTEM FOR SPECIFYING FORMAT PARAMETERS OF A VARIABLE DATA AREA WITHIN A PRESENTATION DOCUMENT

[75] Inventor: Dwight Ross Palmer, Longmont, Colo.

[73] Assignee: International Business Machines Corporation, Armonk, N.Y.

[21] Appl. No.: 08/732,768

[22] Filed: Oct. 21, 1996

[51] Int. Cl.[7] .............................. B41B 15/00; G06F 15/00
[52] U.S. Cl. ....................... 358/1.18; 358/1.18; 358/1.13; 358/1.16; 358/1.17; 707/513
[58] Field of Search .................................... 395/117, 112, 395/115, 116; 364/419.1

[56] References Cited

U.S. PATENT DOCUMENTS

| | | |
|---|---|---|
| 5,251,289 | 10/1993 | Fidler et al. . |
| 5,323,312 | 6/1994 | Saito et al. ............................ 395/117 |
| 5,416,896 | 5/1995 | Motoyama . |
| 5,422,992 | 6/1995 | Motoyoma et al. ................... 395/117 |
| 5,438,657 | 8/1995 | Nakatami . |
| 5,729,665 | 3/1998 | Gauthier ................................ 395/117 |

*Primary Examiner*—Edward L. Coles
*Assistant Examiner*—Twyler Lamb
*Attorney, Agent, or Firm*—Monica D. Lee; Felsman, Bradley, Vaden, Gunter & Dillon, LLP

[57] ABSTRACT

A data processing system and method of processing format parameters of a variable data area within a base document are described. According to the present invention, a base document defined by a data set stored within the data processing system is created utilizing a user application. In response to identification of a portion of the base document as a variable data area, at least one page description language comment statement associated with the variable data area is inserted within the data set. In response to specification of format parameters for the variable data area, the format parameters of the variable data area are encoded within the comment statement. In one embodiment, an identifier of selected variable data to be presented within the variable data area is also encoded within the comment statement.

25 Claims, 9 Drawing Sheets

METHOD AND SYSTEM FOR SPECIFYING FORMAT PARAMETERS OF A VARIABLE DATA AREA WITHIN A PRESENTATION DOCUMENT

BACKGROUND OF THE INVENTION

1. Technical Field

The present invention relates in general to the presentation of a document within a data processing system and in particular to the presentation of a document having a variable data area. Still more particularly, the present invention relates to method and system for easily identifying a variable data area within a document and for specifying format parameters for a variable data object to be presented within the variable data area.

2. Description of the Related Art

Many industries, for example, the publishing and direct marketing industries, rely heavily on high-speed, high-resolution, large-capacity printing. These industries often make use of so-called Print On Demand (POD) print environments that are capable of producing over 400 pages per minute (100 pages per minute in full color) at resolutions of 600 pels per inch or greater. The high performance requirements of a POD environment necessitate the transfer of massive amounts of data to the printhead—on the order of 30 MB per second.

Within POD architectures, data to be printed is typically transmitted to the printer as a document, which comprises both the collection of data objects that constitute the document's content and the resources and formatting specifications that dictate the processing functions to be performed on that content. Documents are constructed of one or more pages, and the pages in turn are made up of data objects such as bar code objects, graphics objects, image objects and presentation text. Each data object has associated layout information that directs the placement and orientation of the data object on the page, as well as the measurement units, page width, page depth, and other format parameters. In addition to fixed data objects such as presentation text, which may be common to multiple copies of a document, POD architectures also typically support variable data objects, which can be unique to each copy of a document. Fixed data objects and associated formatting information are typically conveyed to POD printers in a page description language (PDL) such as PostScript™.

Documents received by a printer in a PDL must be raster image processed (hereinafter referred to as "ripped") before printing in order to obtain the dot pattern that is to appear on the physical print medium. Because of recent improvements in data stream transmission, document caching, paper handling, and duplex printing, the speed at which the raster image processor within the printer is able to rip documents often determines the maximum performance capability of a POD system. If multiple substantially similar copies of a document are desired, ripping the document can be expedited by identifying fixed and variable portions of the document, ripping the fixed portion (the base document) only once, and using the resulting dot pattern for each copy of the document. However, it is often difficult for a user of a POD system to identify which portions of a document are variable data areas and to specify format parameters for the variable data objects to be presented within the variable data areas.

As should thus be apparent, it would be desirable to provide an improved method and system for presenting documents within a POD environment. In particular, it would be desirable to provide an improved method and system for identifying variable data areas of a document and for specifying the format parameters of variable data objects.

SUMMARY OF THE INVENTION

It is therefore one object of the present invention to provide an improved method and system for presenting a document within a data processing system.

It is another object of the present invention to provide an improved data processing system and method for presenting a document having a variable data area.

It is yet another object of the present invention to provide an improved method and system for easily identifying a variable data area within a document and for specifying format parameters for a variable data object to be presented within the variable data area.

The foregoing objects are achieved as is now described. A data processing system and method of processing format parameters of a variable data area within a base document are provided. According to the present invention, a base document defined by a data set stored within the data processing system is created utilizing a user application. In response to identification of a portion of the base document as a variable data area, at least one page description language comment statement associated with the variable data area is inserted within the data set. In response to specification of format parameters for the variable data area, the format parameters of the variable data area are encoded within the comment statement. In one embodiment, an identifier of selected variable data to be presented within the variable data area is also encoded within the comment statement.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
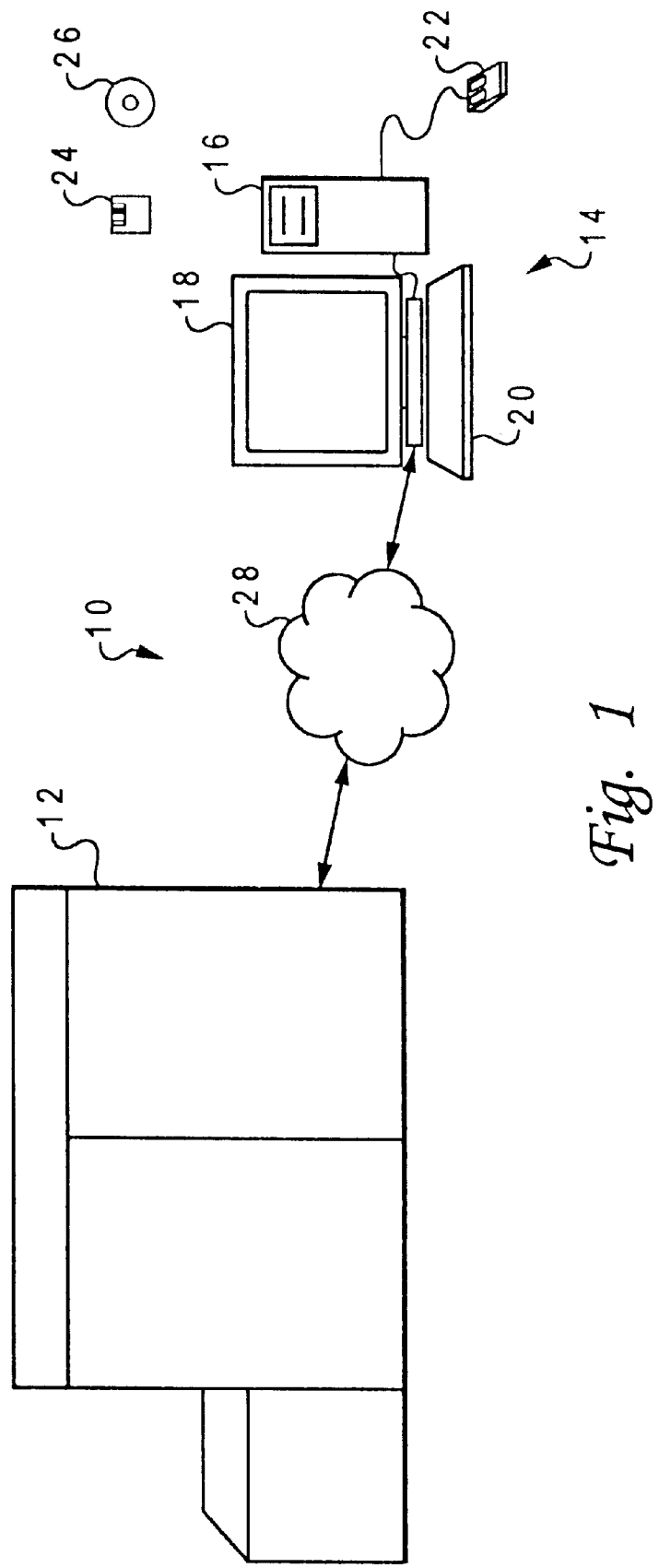
FIG. 1 depicts an illustrative embodiment of a data processing system, which, in accordance with the present invention, comprises a Print On Demand (POD) environment.

With reference now to the figures and in particular with reference to FIG. 1, there is depicted an illustrative embodiment of a data processing system in accordance with the present invention. As illustrated, data processing system 10 includes computer system 14, which comprises personal computer 16, display device 18, keyboard 20, and mouse 22. In accordance with present invention, a user of computer system 14 can run one or more page layout or word processing programs on personal computer 16 in order to compose a presentation document. As will be appreciated by those skilled in the art, these user applications typically enable a user to determine the content and format of a presentation document through the entry of appropriate inputs via keyboard 20 and mouse 22. The user applications and presentation documents can be stored to and retrieved from storage within personal computer 16 (e.g., memory or hard disk drive) and recordable media such as diskette 24 and optical disk 26.

As illustrated, computer system 14 is coupled to printer 12 via network 28 such that computer system 14 and printer 12 together comprise a Print On Demand (POD) presentation system. In order to maximize the presentation throughput of printer 12, network 28, which can comprise a Local Area Network (LAN), Wide Area Network (WAN), or other computer network such as the Internet or World Wide Web, preferably includes one or more additional computer systems that function as print servers to printer 12. Printer 12 is a high-speed, large-capacity, high-resolution printer, such as the IBM 3170 and IBM 3900-D3 printers available from International Business Machines Corporation (IBM) of Armonk, N.Y. As described in greater detail herein below, the present invention permits a user to identify variable data areas within a presentation document to be printed by printer 12 and to easily specify format parameters for the variable data objects to be presented within the variable data areas.

Figure 2:
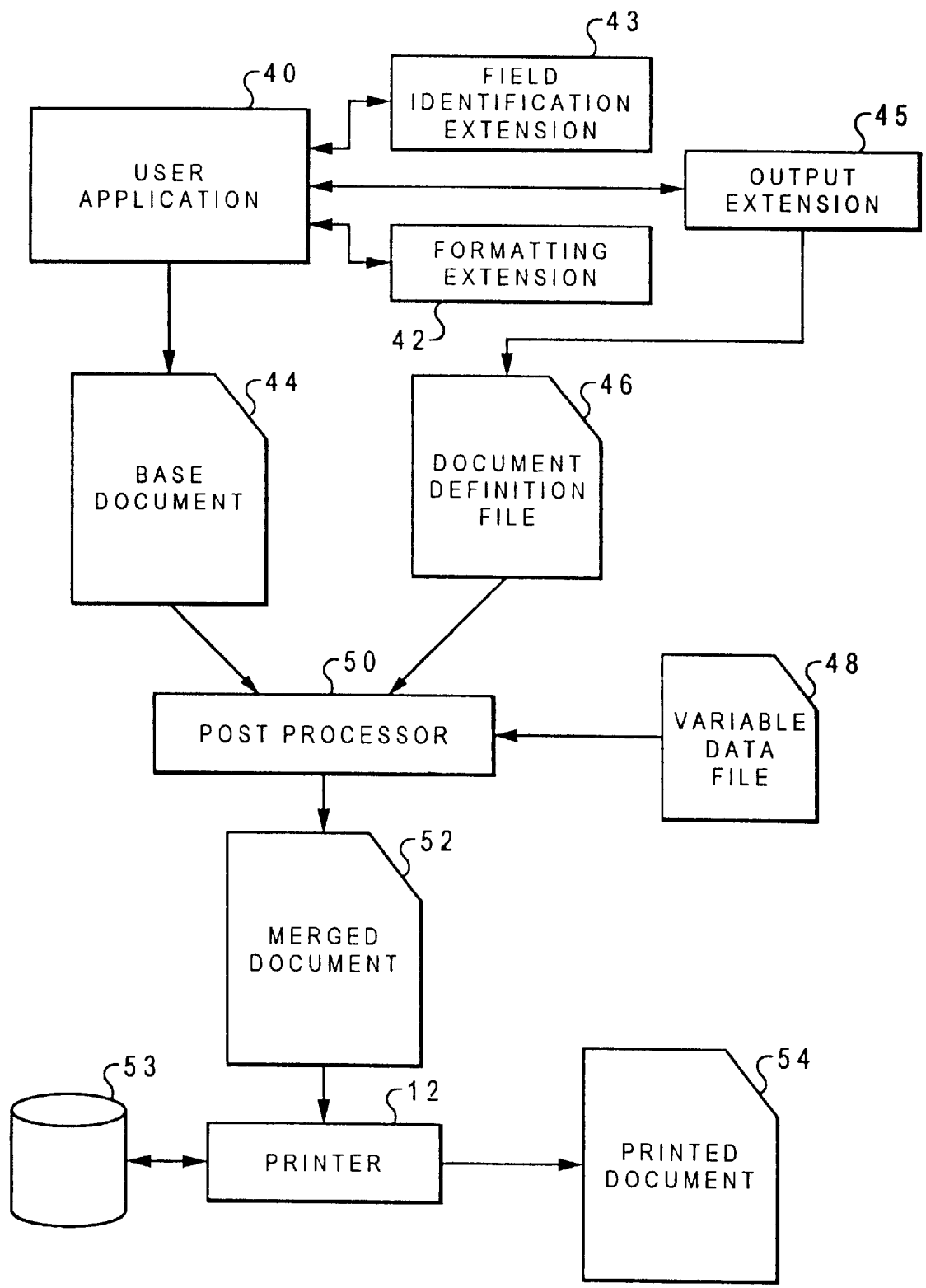
FIG. 2 illustrates the data flow of document presentation within the data processing system illustrated in FIG. 1.

Referring now to FIG. 2, there is illustrated a data flow diagram of the presentation of a document by printer 12. As illustrated in FIG. 2, a base document 44 is created by a user of computer system 14 utilizing user application 40, which comprises a conventional page layout or word processing program, for example. In accordance with the present invention, base document 44 is defined by a data set comprising fixed data objects, such as presentation text and graphics objects, and includes one or more variable data areas that the user desires to reserve for variable data objects. User application 40 is provided with a formatting extension 42 that can be invoked by the user from within user application 40 in order to identify and format variable data areas within base document 44. In addition, user application 40 is provided with field identification extension 43, which can be utilized to identify a field within variable data file 48 that contains a variable data object to be presented within a particular variable data area of base document 44. As depicted, the variable data area format parameters and variable data field identifiers specified utilizing formatting extension 42 and field identification extension 43, respectively, are output together by output extension 45 as document definition file 46. Although illustrated separately for clarity, extensions 42, 43, and 45 can together be viewed as a single variable data area definition program.

Base document 44 and document definition file 46 are received as inputs by post processor 50, which preferably comprises a custom application (such as the IBM product MERGEDOC) running on computer system 14 or another computer system within network 28. However, in an alternative embodiment of the present invention, post processor 50 comprises an additional extension to user application 40. In response to receipt of base document 44 and document definition file 46, post processor 50 produces a merged document 52, which comprises one or more files that incorporate base document 44 and selected variable data 48. In a preferred embodiment of the present invention, merged document 52 includes one variable data page for each base document page that includes a variable data area. Within the variable data pages, each variable data object is positioned at a location corresponding to that of an associated variable data area within a page of base document 44 and is formatted in accordance with the variable data area format parameters specified within document definition file 46. In this preferred embodiment, merged document 52 further comprises base document 44, which is included as a separate group of resource objects (e.g., base document pages), and instructions specifying how the base document pages and variable data pages are to be overlayed.

Merged document 52 is then transmitted to printer 12, which includes a raster image processor (RIP) that generates a raster (bit-mapped) image of each page within a presentation document. In accordance with a preferred embodiment of the present invention, the raster image of the presentation document is generated by ripping each base document page within merged document 52 only once regardless of the number of copies of the presentation document that are to be presented. In addition, the variable data pages are ripped and the resulting dot patterns are overlayed within designated pages of base document 44. The presentation-ready document(s) thus constructed can then be spooled to disk 53 for subsequent presentation or can alternatively be presented as printed document 54. The present invention improves the data flow depicted in FIG. 2 by enabling the user to easily identify and format variable data areas within base document 44 and by outputting document definition file 46 such that variable data area format parameters can be applied to identified variable data areas within variable data file 48 during post processing.

Figure 3:
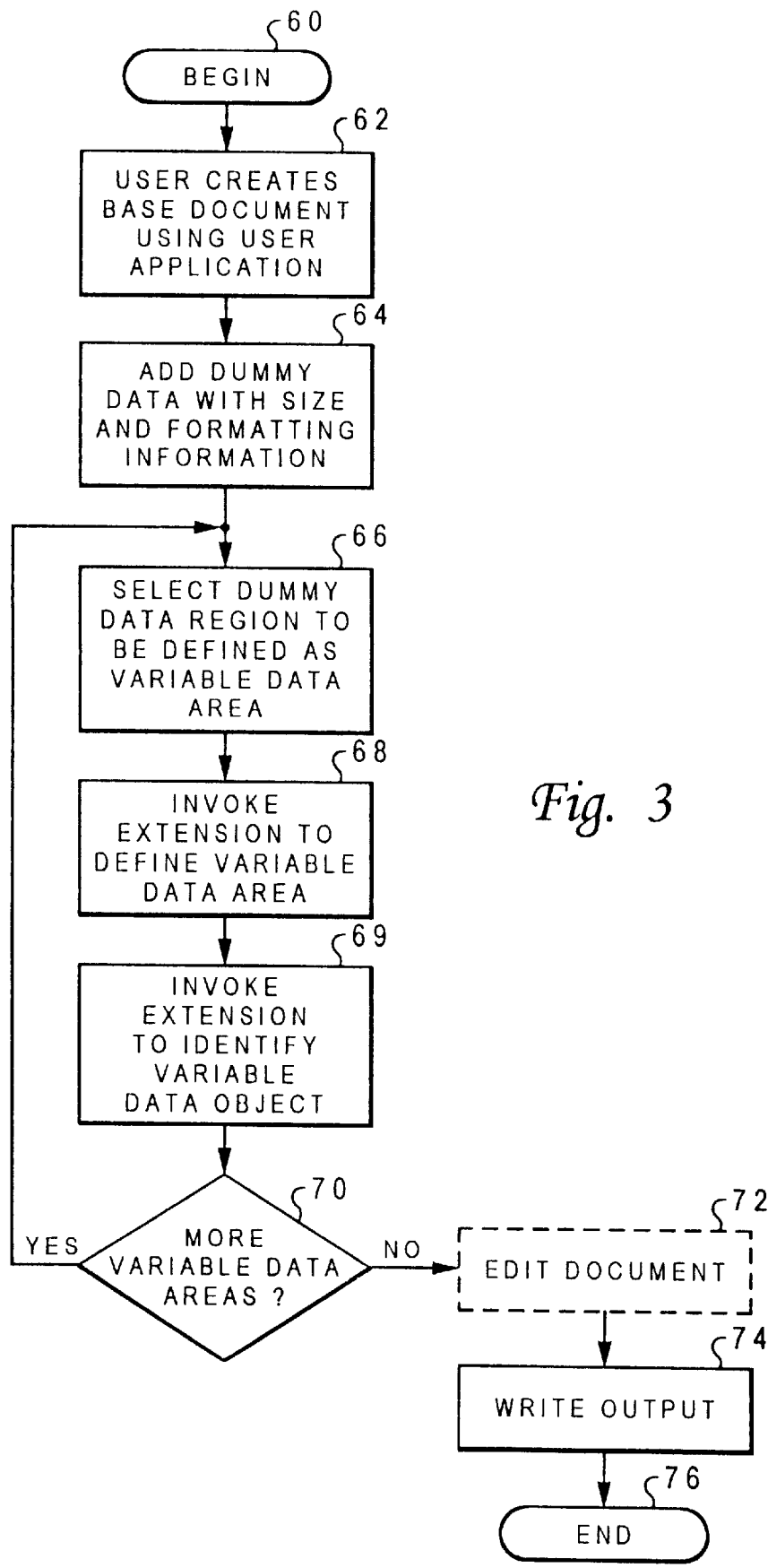
FIG. 3 is a high level logical flowchart depicting a method for processing a base document within a user application, wherein the base document includes at least one variable data area.

With reference now to FIG. 3, there is depicted a high level logical flowchart of a method by which a user of computer system 14 can create a base document 44 that includes one or more variable data areas. As illustrated, the process begins at block 60 and thereafter proceeds to block 62, which illustrates a user of computer system 14 creating a new base document 44 within user application 40 utilizing a standard user application command. As will be appreciated by those skilled in the art, following the creation of base document 44, the user can then add selected presentation text or other data objects to base document 44 utilizing the facilities provided by user application 40.

Figure 6A:
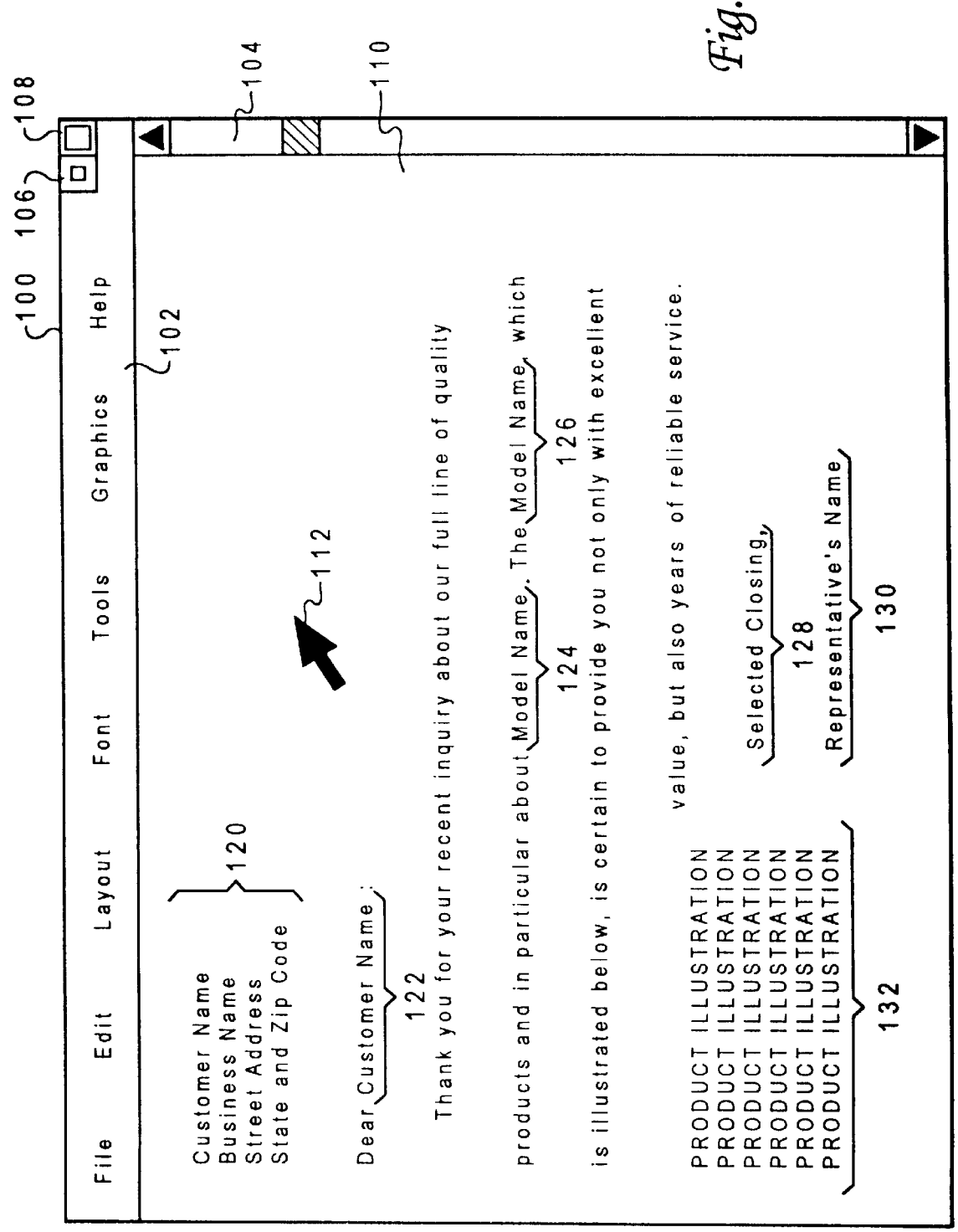
FIGS. 6A–6C are pictorial representations of a user application window in which a user is permitted to format variable data areas of a base document in accordance with the present invention.

For example, with reference now to FIG. 6A, there is illustrated an exemplary embodiment of the user interface of user application 40. As illustrated, a conventional application window 100, which is displayed by user application 40 within display device 18, includes menu bar 102, scroll bar 104, minimize button 106, maximize button 108, and document field 110. As in conventional graphical user interfaces, a user can select items from menu bar 102 or data objects within document field 110 utilizing graphical pointer 112, which is generated by an operating system of computer system 14. In order to create a new base document 44, the user can simply begin entering data within document field 110 or can alternatively select the pull-down menu item "Create Document" under the menu bar selection "File." In the depicted example, base document 44 is a business form letter that the user has prepared as a response to customer requests for product information.

Referring again to FIG. 3, the process proceeds from block 62 to block 64, which illustrates the user entering dummy data within base document 44 at locations where the user desires to display variable data. The user can format and size the dummy data utilizing the standard formatting facilities provided by user application 40. For example, referring again to FIG. 6A, base document 44 includes dummy data regions 120–132. Within each of dummy data regions 120-132, the user has entered dummy data identifying the variable data that the user desires to insert into each respective dummy data region. As indicated within dummy data region 132, the variable data to be presented with base document 44 can include graphical objects as well as presentation text.

Figure 6B:
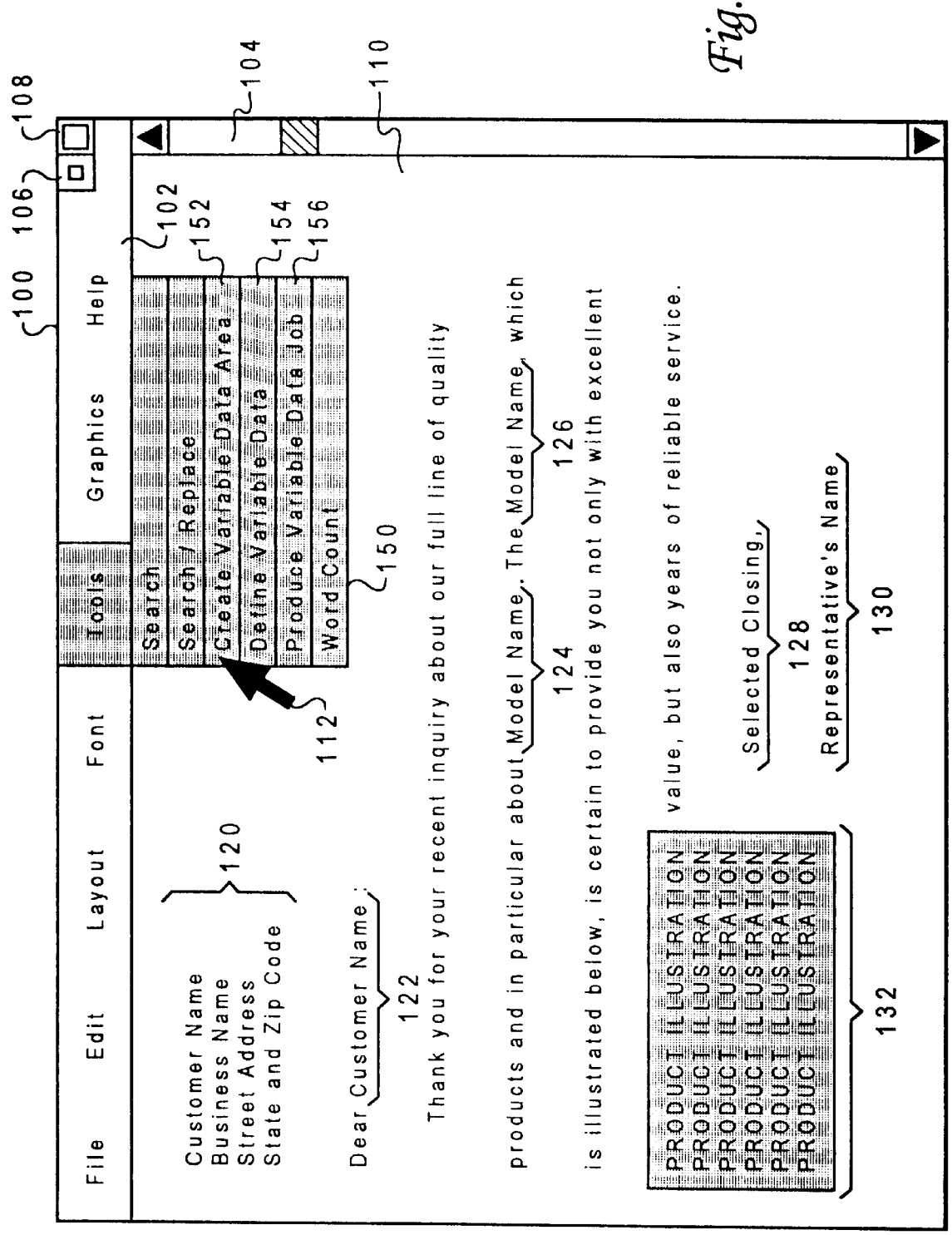

Returning to FIG. 3, the process proceeds from block 64 to block 66, which depicts the user selecting a dummy data region within base document 44 that the user desires to define as a variable data area. Next, the process proceeds to block 68, which illustrates the user invoking formatting extension 42 to define the dummy data region selected at block 66 as a variable data area. Referring now to FIG. 6B, there is illustrated a second view of the application window 100 depicted in FIG. 6A. In FIG. 6B, the user has selected dummy data region 132 utilizing graphical pointer 112, as indicated by shading or highlighting. In addition, the user is invoking formatting extension 42 to define dummy data region 132 as a variable data area by selecting menu item 152 from pull-down menu 150 utilizing graphical pointer 112.

Figure 4:
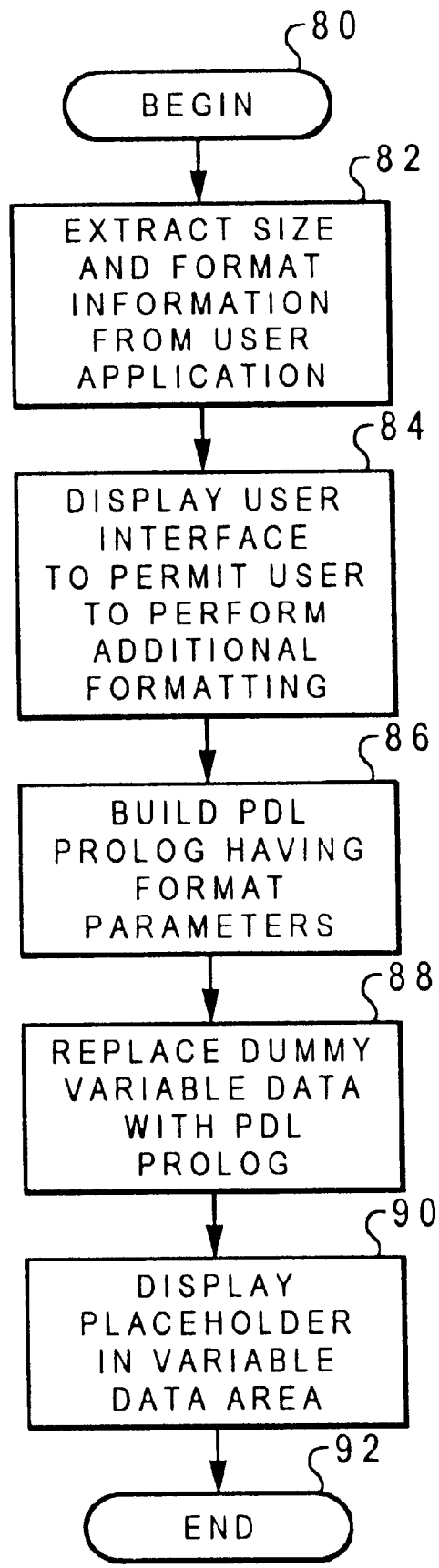
FIG. 4 is a high level logical flowchart illustrating a method of representing variable data area format parameters within a base document.

Referring now to FIG. 4, there is illustrated a high level logical flowchart of the method by which formatting extension 42 defines a selected dummy data region within base document 44 as a variable data area. As depicted, the process begins at block 80 and thereafter proceeds to block 82, which illustrates formatting extension 42 querying user application 40 to obtain the size and format information associated with dummy data region 132 of base document 44. The process proceeds from block 82 to block 84, which depicts formatting extension 42 displaying a user interface, for example, a dialog box, in order to permit the user to perform additional formatting functions, such as choosing scaling options to fit a graphical variable data object to the variable data area.

Next, the process passes to block 86, which illustrates formatting extension 42 building an Encapsulated PostScript (EPS) prolog that specifies the variable data area format parameters obtained at blocks 82 and 84. Those skilled in the art will appreciate that the EPS prolog generated at block 86 is a set of page description language comment (i.e., nonprintable) statements commonly supported by conventional page layout and word processing programs. EPS prologs are typically utilized to introduce a series of page description language (PDL) commands specifying, in either raster or vector format, the data to be printed. However, according to the present invention, all formatting information for the variable data area being defined is placed within the EPS prolog rather than within a PDL command. The advantage of encoding the format parameters of the variable data area within the EPS prolog is that these comment statements, while nearly universally compatible with user applications, are ignored by the raster image processors (RIP) within printers. Thus, the user is able to specify format parameters of variable data areas within a base document without the variable data objects themselves being present within the base document. In accordance with the present invention, an EPS prolog containing variable data area format parameters also preferably includes a unique string, which as described below, permits the EPS prolog to be identified during subsequent processing.

Figure 6C:
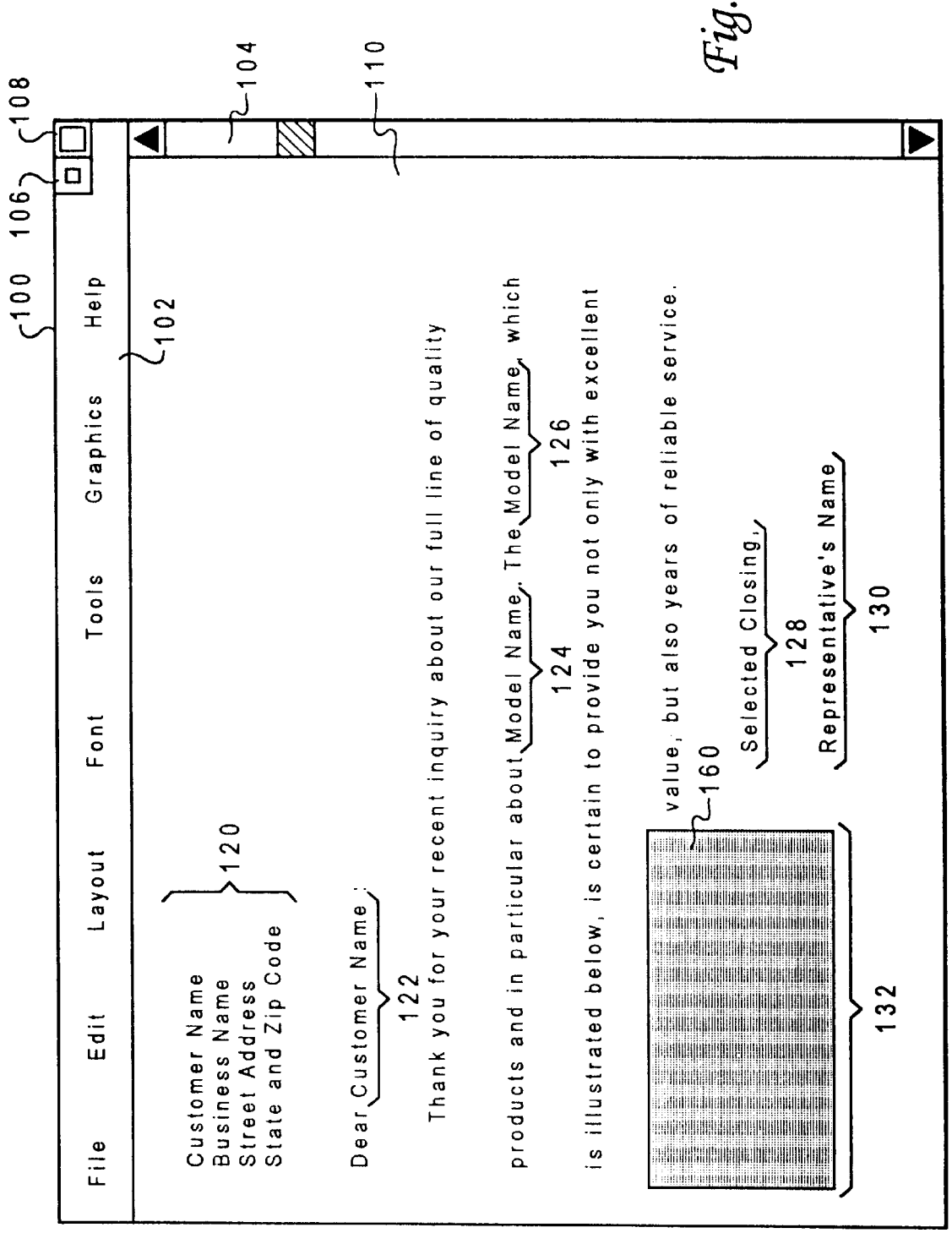

Still referring to FIG. 4, the process proceeds from block 86 to block 88, which illustrates formatting extension 42 replacing the dummy data within the dummy data region 132 with the PDL prolog generated at block 86. Then, as illustrated at block 90 of FIG. 4 and at reference numeral 160 of FIG. 6C, a placeholder object is displayed to the user in place of the dummy data in order to confirm to the user that dummy data region 132 has been defined as a variable data area. Thereafter, the process illustrated in FIG. 4 passes to block 92 and returns.

Returning to FIG. 3, the process passes from block 68 to block 69. Block 69 depicts the user invoking field identification extension 43 in order to identify a variable data object to be presented within the selected variable data area. In the exemplary embodiment illustrated in FIG. 6B, field identification extension 43 is invoked by selecting menu item 154 of pull-down menu 150; however, in an alternative embodiment, formatting extension 42 and field identification extension 43 can both be invoked by a single user input.

Figure 5:
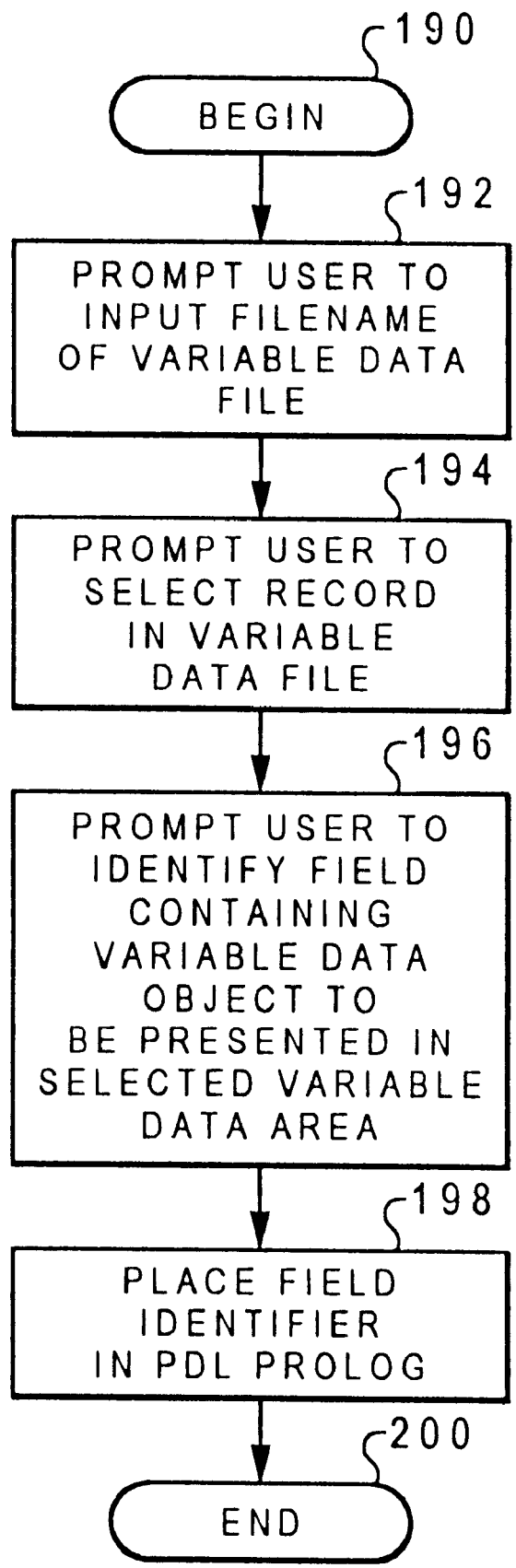
FIG. 5 is a high level logical flowchart depicting a method of identifying a variable data object to be presented within a variable data area of a base document.

With reference now to FIG. 5, there is illustrated a high level logical flowchart of the method by which field identification extension 43 permits the user to identify a variable data object to be presented within a variable data area of base document 44. As depicted, the process begins at block 190 in response to user invocation and thereafter proceeds to block 192, which illustrates field identification extension 43 prompting the user to input the filename of a variable data file 48 that contains the variable data object to be presented within the selected variable data area of base document 44. For example, field identification extension 43 may display to the user a dialog box listing all databases within a specified directory of computer system 14. In response to the user specifying the filename of variable data file 48, the process proceeds to block 194, which depicts field identification extension 43 prompting the user to select a record within variable data file 48. In the example depicted in FIG. 6B, where the user has previously defined dummy data region 132 as a variable data area, the user desires to present an illustration of a product about which the customer has inquired. Accordingly, at block 194 the user selects a record containing data related to the product. The process then proceeds to block 196, which illustrates field identification extension 43 prompting the user to identify a field that contains the variable data object to be presented within the selected variable data area. In response to the user identifying a field, which in the instant example contains a graphical illustration of the product, the process passes to block 198. Block 198 depicts field identification extension 43 placing an identifier of the field specified by the user within the PDL prolog built at block 86 of FIG. 4. Thereafter, the process proceeds to block 200 and returns to block 70 of FIG. 3.

Block 70 of FIG. 3 illustrates the user determining whether or not to define additional variable data areas. In response to a determination that additional variable data areas remain to be defined, the user can repeat the steps illustrated at blocks 66–69, which have been described. However, in response to a determination by the user that no more variable data areas remain to be defined, the process proceeds to block 72. Block 72 illustrates the user optionally editing base document 44 to reposition or format the variable data areas. Because the variable data areas are defined by PDL prologs recognizable by user application 40, the user can manipulate the variable data areas just like other data objects and associate additional formatting information with the variable data areas without again invoking formatting extension 42. The process then passes from block 72 to block 74, which depicts the user invoking output extension 45 (e.g., by selecting menu item 156 from pull-down menu 150) in order to output base document 44 and document definition file 46. Base document 44 and document definition file 46 can be written to disk, or alternatively, transmitted to post processor 50 to initiate presentation of printed document 54. Thereafter, the process depicted in FIG. 3 terminates at block 76.

Figure 7:
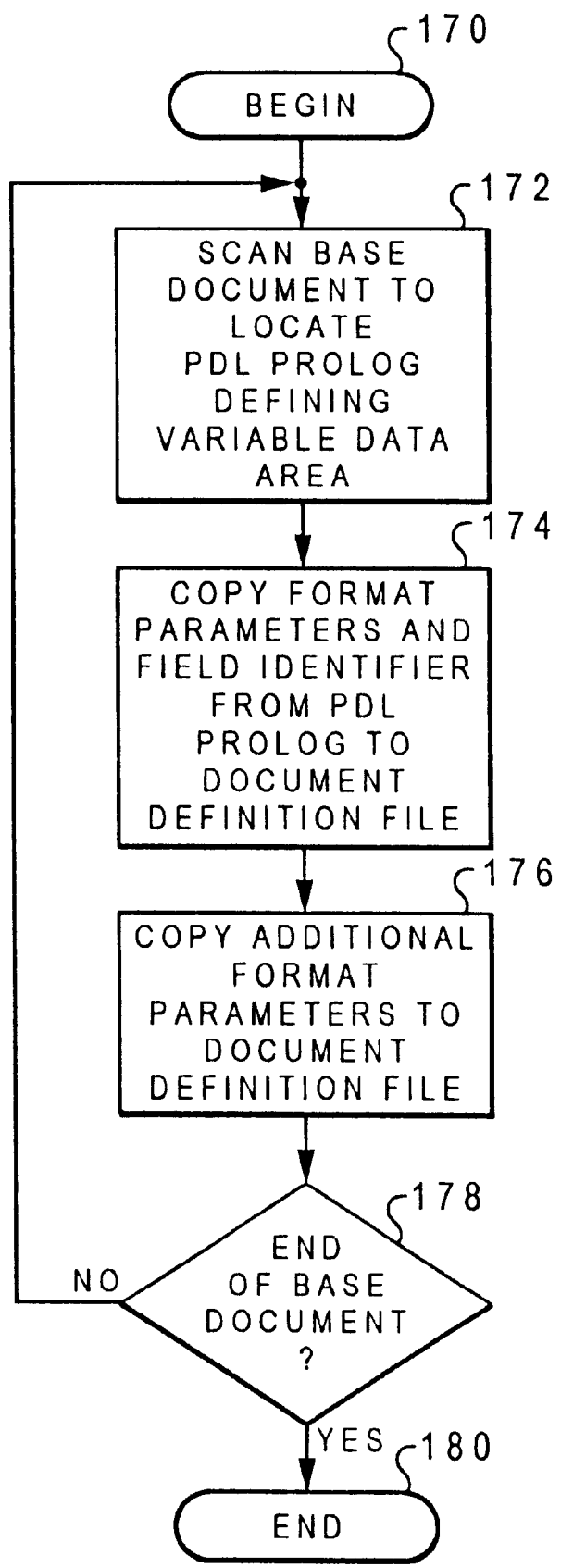
FIG. 7 is a high level logical flowchart illustrating a method of outputting variable data object identifiers and variable data area format parameters in accordance with the present invention.

Referring now to FIG. 7, there is illustrated a high level logical flowchart of the method by which output extension 45 generates document definition file 46 from the EPS prologs within base document 44. As illustrated, the process begins at block 170 and thereafter proceeds to block 172, which illustrates output extension 45 scanning base document 44 to locate a EPS prolog that defines a variable data area within base document 44. As noted above, the EPS prologs utilized to define variable data areas include a unique string that identifies these prologs. In response to output extension 45 locating an EPS prolog that defines a variable data area within base document 44, the process proceeds to block 174, which illustrates output extension 45 copying the format parameters and field identifier from the EPS prolog to document definition file 46. In addition, as depicted at block 176, any additional format parameters associated with the variable data area by the editing illustrated at block 72 of FIG. 3 are copied to document definition file 46. Next, a determination is made at block 178 whether or not the end of base document 44 has been reached. If not, the process returns to blocks 172–176, which have described. However, in response to a determination that the end of base document 44 has been reached, the process passes to block 180 and returns.

As has been described, the present invention provides an improved method and system for processing a base document including one or more variable data areas. According to the present invention, variable data area format parameters are encoded within PDL comment statements, thereby enabling the PDL comment statements to be manipulated within base document 44 while making the variable data format parameters transparent to the raster image processor (RIP) within the printer. In addition, field identifiers that specify particular variable data objects to be presented within the variable data areas are encoded in the PDL comment statements so that the variable data objects may be easily retrieved from a designated database during post-processing. Although the present invention has been described with reference to a POD presentation environment, those skilled in the art will appreciate that the present invention can also be advantageously applied to other presentation environments.

Furthermore, although aspects of the present invention have been described with respect to specific "method steps" implementable on a computer systems, in an alternate embodiment, the present invention may be implemented as a computer program product for use with a computer system. Those skilled in the art should readily appreciate that programs defining the functions of the present invention can be delivered to a computer via a variety of signal-bearing media, which include, but are not limited to: (a) information permanently stored on non-writable storage media (e.g., read only memory devices within a computer such as ROM or CD-ROM disks readable by a CD-ROM drive); (b) information alterably stored on writable storage media (e.g., a floppy diskette or hard disk drive); or (c) information conveyed to a computer through communication media, such as through a computer or telephone network. It should be understood, therefore, that such signal-bearing media, when carrying computer readable instructions that direct the method functions of the present invention, represent alternative embodiments of the present invention.

While the invention has been particularly shown and described with reference to a preferred embodiment, it will be understood by those skilled in the art that various changes in form and detail may be made therein without departing from the spirit and scope of the invention.

What is claimed is:

1. A method of processing a document within a data processing system including a user application, said method comprising:

in response to a selected input, creating a base document utilizing said user application, wherein said base document is defined by a data set stored within said data processing system;

in response to identification of a portion of said base document as a variable data area in which different data will be presented for at least two presentation copies of said document, building, within said data set, at least one comment statement of a page description language, wherein said at least one comment statement is associated with said variable data area; and encoding format parameters of said variable data area within said at least one comment statement.

2. The method of claim 1, and further comprising the step of specifying said format parameters of said variable data area utilizing facilities of said user application.

3. The method of claim 2, wherein said specifying step further comprises the step of extracting at least one of said format parameters from said data set.

4. The method of claim 1, wherein said variable data area is associated with data within said data set that specifies a content of said variable data area, said method further including the step of discarding data from said data set that specifies said content of said variable data area.

5. The method of claim 1, and further comprising the step of:

in response to identification of selected variable data to be presented within said variable data area of said base document, encoding an identifier of said selected variable data within said at least one comment statement associated with said variable data area.

6. The method of claim 1, and further comprising:

in response to an output request, obtaining said format parameters of said variable data area from said at least one comment statement within said data set defining said base document; and outputting said base document and said format parameters such that selected variable data can subsequently be presented within said variable data area of said base document in a format indicated by said format parameters.

7. The method of claim 6, and further comprising the step of presenting a composite document including said base document and said selected variable data, wherein said selected variable data are presented within said variable data area of said base document in a format specified by said format parameters.

8. The method of claim 7, wherein said step of presenting said composite document comprises the step of printing said composite document.

9. The method of claim 1, wherein building at least one comment statement of a page description language comprises building at least one encapsulated PostScript comment statement.

10. A data processing system, comprising:

a processor;

a memory coupled to said processor;

a user application stored within said memory and executable by said processor, wherein said user application can be utilized to create a base document defined by a data set stored within said memory;

a variable data area definition program stored within said memory and executable by said processor, wherein in response to identification of a portion of said base document as a variable data area in which different data will be presented for at least two presentation copies of said document, said variable data area definition program builds, within said data set, at least one comment statement of a page description language, wherein said at least one comment statement is associated with said variable data area and specifies format parameters for said variable data area.

11. The data processing system of claim 10, said variable data area definition program further comprising formatting facilities that permit a user to specify format parameters for said variable data area of said base document.

12. The data processing system of claim 11, wherein said formatting facilities further comprise means for extracting at least one of said format parameters from said data set.

13. The data processing system of claim 10, wherein said variable data area is associated with data within said data set that specifies a content of said variable data area, wherein at least one of said user application and said variable data area definition program includes means for discarding data from said data set that specifies said content of said variable data area.

14. The data processing system of claim 10, said data processing system further comprising:

means for identifying selected variable data to be presented within said variable data area of said base document; and means, responsive to identification of said selected variable data, for encoding an identifier of said selected variable data within said at least one comment statement associated with said variable data area.

15. The data processing system of claim 10, wherein said variable data area definition program further comprises:

means, responsive to an output request, for obtaining said format parameters of said variable data area from said at least one comment statement within said data set defining said base document; and means for outputting said base document and said format parameters such that selected variable data can subsequently be presented within said variable data area of said base document in a format indicated by said format parameters.

16. The data processing system of claim 15, and further comprising:

a presentation device that presents a composite document including said base document and said selected variable data, wherein said selected variable data is presented within said variable data area of said base document in a format specified by said format parameters.

17. The data processing system of claim 16, wherein said presentation device comprises a printer.

18. The data processing system of claim 10, wherein said page description language comment statement is an encapsulated PostScript comment statement.

19. A program product usable by a data processing system including a user application that can be utilized to create a base document defined by a data set stored within said data processing system, said program product comprising:

a variable data area definition program, wherein in response to identification of a portion of said base document as a variable data area, said variable data area definition program builds, within said data set, at least one comment statement of a page description language, said at least one comment statement being associated with said variable data area, and wherein in response to specification of format parameters for said variable data area, said variable data area definition program encodes said format parameters within said at least one comment statement; and a signal bearing media bearing said variable data area definition program.

20. The program product of claim 19, said variable data area definition program further comprising formatting facilities that permit a user to specify format parameters for said variable data area of said base document.

21. The program product of claim 20, wherein said formatting facilities further comprise instruction code for extracting at least one of said format parameters from said data set.

22. The program product of claim 19, wherein said variable data area is associated with data within said data set that specifies a content of said variable data area, wherein said variable data area definition program includes instruction code for discarding data from said data set that specifies said content of said variable data area.

23. The program product of claim 19, said variable data area definition program further comprising:

instruction code, responsive to identification of said selected variable data, for encoding an identifier of said selected variable data within said at least one comment statement associated with said variable data area.

24. The program product of claim 19, wherein said variable data area definition program further comprises:

instruction code, responsive to an output request, for obtaining said format parameters of said variable data area from said at least one comment statement within said data set defining said base document; and instruction code for outputting said base document and said format parameters such that selected variable data can subsequently be presented within said variable data area of said base document in a format indicated by said format parameters.

25. The program product of claim 19, wherein said page description language comment statement is an encapsulated PostScript comment statement.

* * * * *